US010812272B1

(12) United States Patent
Copeland et al.

(10) Patent No.: US 10,812,272 B1
(45) Date of Patent: Oct. 20, 2020

(54) IDENTIFYING COMPUTING PROCESSES ON AUTOMATION SERVERS

(71) Applicant: CyberArk Software Ltd., Petach-Tikva (IL)

(72) Inventors: Andrew Copeland, Boston, MA (US); Edward Nunez, Fremont, CA (US)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/741,067

(22) Filed: Jan. 13, 2020

(51) Int. Cl.
*H04L 9/32* (2006.01)
*H04L 9/14* (2006.01)
*H04L 9/08* (2006.01)

(52) U.S. Cl.
CPC .......... *H04L 9/3247* (2013.01); *H04L 9/0866* (2013.01); *H04L 9/0894* (2013.01); *H04L 9/14* (2013.01)

(58) Field of Classification Search
CPC ....... H04L 9/3247; H04L 9/14; H04L 9/0894; H04L 9/0866
USPC .......................................................... 713/176
See application file for complete search history.

(56) References Cited

U.S. PATENT DOCUMENTS

| 9,866,392 | B1* | 1/2018 | Campagna | ............ | H04L 9/3247 |
| 9,894,067 | B1* | 2/2018 | Mandadi | ............. | H04L 63/0876 |
| 2005/0229004 | A1* | 10/2005 | Callaghan | ............... | G06F 21/33 |
| | | | | | 713/185 |
| 2010/0094981 | A1* | 4/2010 | Cordray | ................... | H04L 41/20 |
| | | | | | 709/222 |
| 2014/0380058 | A1 | 12/2014 | Agarwal et al. | | |
| 2016/0342803 | A1* | 11/2016 | Goodridge | .......... | G06F 21/6218 |
| 2018/0307840 | A1* | 10/2018 | David | .................... | G06F 21/568 |
| 2019/0207772 | A1* | 7/2019 | Hecht | ..................... | H04L 63/00 |
| 2019/0372993 | A1* | 12/2019 | Dunjic | .................. | H04L 9/3213 |

FOREIGN PATENT DOCUMENTS

CN    109002705 A    12/2018

OTHER PUBLICATIONS

CyberArk Solution Brief, "Privileged Access Security for Enterprise Robotic Process Automation (RPA)", pp. 1-2.
CyberArk Solution Brief, "Centrally Manage and Secure the Robotic Process Automation (RPA) Pipeline with CyberArk and UIPath", pp. 1-2.

(Continued)

*Primary Examiner* — Samson B Lemma
(74) *Attorney, Agent, or Firm* — Finnegan, Henderson, Farabow, Garrett & Dunner LLP

(57) ABSTRACT

Disclosed embodiments relate to systems and methods for identifying computing processes on automation servers and authorizing computing processes to grant access to secure resources. Techniques include receiving an access request, obtaining process data, identifying a cryptographic key, generating a digital signature, sending the digital signature, and receiving authorization data from a security server. Further techniques include receiving process data, receiving a digital signature, accessing a cryptographic key, validating the signature with the key, verifying the process, and transmitting authorization data to an automation server to complete an authentication process.

20 Claims, 4 Drawing Sheets

(56) References Cited

OTHER PUBLICATIONS

Wikipedia, "Denial-of-Service Attack", retrieved Jan. 8, 2020, Retrieved from the Internet, URL: https://en.wikipedia.org/wiki/Denial-of-service_attack#Amplification, pp. 1-26.
Communication and Search Report, issued from the European Patent Office in corresponding Application No. 20156737.7—1213/3674938, dated Aug. 14, 2020 (6 pages).

\* cited by examiner

IDENTIFYING COMPUTING PROCESSES ON AUTOMATION SERVERS

BACKGROUND

Continuous development or continuous deployment software practices (e.g., DevOps) have become important techniques for developing, updating, and implementing software code. DevOps environments often use automation tools to implement continuous integration and/or deployment of new software code. The automation tools may be used to build and test new code before it is implemented. In order to execute some processes within the code, an automation server (e.g., based on Jenkins™, Chef™, Puppet™, Ansible™, etc.) may require access to secure resources. In some systems, hardcoded credentials or application programming interface ("API") keys may be used for authorizing a process being executed on an automation server for secure access. Hardcoded credentials are not desirable because, among other reasons, they are not easily updated and are vulnerable to theft. API keys also present potential security risks because they are often less secure than authentication tokens. Further, API keys may be available to multiple network identities or leaked, thus potentially giving malicious entities access to secure resources. API keys are therefore often rotated or revoked over time, which may require additional resources or systems, and thus added cost and inefficiency.

Accordingly, there are needs for solutions that can identify and securely authenticate processes being run by an automation tool. Such solutions should permit a process to be uniquely identified and allow the process to be authenticated in a secure and efficient manner. It would further be advantageous for solutions to identify and authenticate a process using data associated with the process. For additional security, the data could be digitally signed using a cryptographic key, where it could be later decrypted and used by a security entity to identify the process.

SUMMARY

The disclosed embodiments describe non-transitory computer readable media, systems, and methods for identifying computing processes on automation servers. For example, in an exemplary embodiment, there may be a non-transitory computer readable medium including instructions that, when executed by at least one processor, cause the at least one processor to perform operations for identifying processes on automation servers. The operations may comprise obtaining, from an automation server, process data associated with a particular process; identifying a cryptographic signature associated with the process data, the cryptographic signature being generated using a first cryptographic key; sending the process data and cryptographic signature to a security network resource; and conditional on the security network resource validating the cryptographic signature using a second cryptographic key, permitting the particular process to operate according to a corresponding authorization control.

According to a disclosed embodiment, the operations may further comprise verifying, in conjunction with validating the cryptographic signature, that the particular process is currently running on the automation server.

According to a disclosed embodiment, the validating of the cryptographic signature may be performed before the verifying that the particular process is currently running on the automation server.

According to a disclosed embodiment, the process data may include a build name associated with the particular process.

According to a disclosed embodiment, the process data may include a build number associated with the particular process.

According to a disclosed embodiment, the automation server may operate in conjunction with at least one of: a continuous development platform or a continuous deployment platform.

According to a disclosed embodiment, the automation server may operate in conjunction with a robotic automation platform.

According to a disclosed embodiment, the particular process may be at least one of: a virtual machine process, a container instance process, or a serverless code process.

According to a disclosed embodiment, the second cryptographic key may correspond to the automation server.

According to a disclosed embodiment, the operations may further comprise, conditional on the security network resource validating the cryptographic signature using the second cryptographic key, receiving authorization data for authorizing the automation server to implement the particular process.

According to another disclosed embodiment, a method may be implemented for identifying processes on automation servers. The method may comprise receiving at a security network resource, from an automation server, process data associated with a particular process; receiving, from the automation server, a cryptographic signature associated with the process data, the cryptographic signature being generated by the automation server using a first cryptographic key; accessing a second cryptographic key; validating the cryptographic signature using the second cryptographic key; and conditional on a successful result of the validating, permitting the particular process to operate according to a corresponding authorization control.

According to a disclosed embodiment, the process data may be metadata associated with the particular process.

According to a disclosed embodiment, the method may further comprise verifying, in conjunction with validating the cryptographic signature, that the particular process is currently running on the automation server.

According to a disclosed embodiment, the validating of the cryptographic signature may be performed before the verifying that the particular process is currently running on the automation server.

According to a disclosed embodiment, the method may further comprise conditional on the successful result of the validating, sending authorization data to the automation server.

According to a disclosed embodiment, the authorization data may be provisioned based on a least-privilege policy that specifies a minimal scope of privileges for the particular process.

According to a disclosed embodiment, the authorization data may be configured to enable the automation server to retrieve an access credential.

According to a disclosed embodiment, the access credential may be provisioned in accordance with the least-privilege policy.

According to a disclosed embodiment, the access credential may be retrieved from a credential vault.

According to a disclosed embodiment, the access credential may be retrieved from the security network resource.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

In accordance with disclosed techniques, a system may include an automation server that dynamically runs processes, for example, as part of a DevOps (e.g., continuous integration or continuous deployment) process. As discussed further below, the automation server may facilitate the testing, review, and production of code to be implemented by the DevOps process in a computing environment. While inspecting code in the DevOps process, the automation server may run processes that require access to secrets, and therefore may require authentication to gain access to the secrets. In other instances, a process running on the automation server may require access to a secured network resource, for example, a database, a virtual machine, a container instance, etc. In the disclosed embodiments, techniques for identifying processes on automation servers and authenticating processes are described. In some embodiments, an application programming interface key is not needed to authenticate the process, which may increase the security of the system. Rather, the automation server may interact with a security server that may authenticate the process running on the automation server using data related to process and/or a cryptographic signature of the process data. If the authentication is completed, the process may gain the requested access to secrets or secure resources.

Reference will now be made in detail to the disclosed embodiments, examples of which are illustrated in the accompanying drawings.

Figure 1:
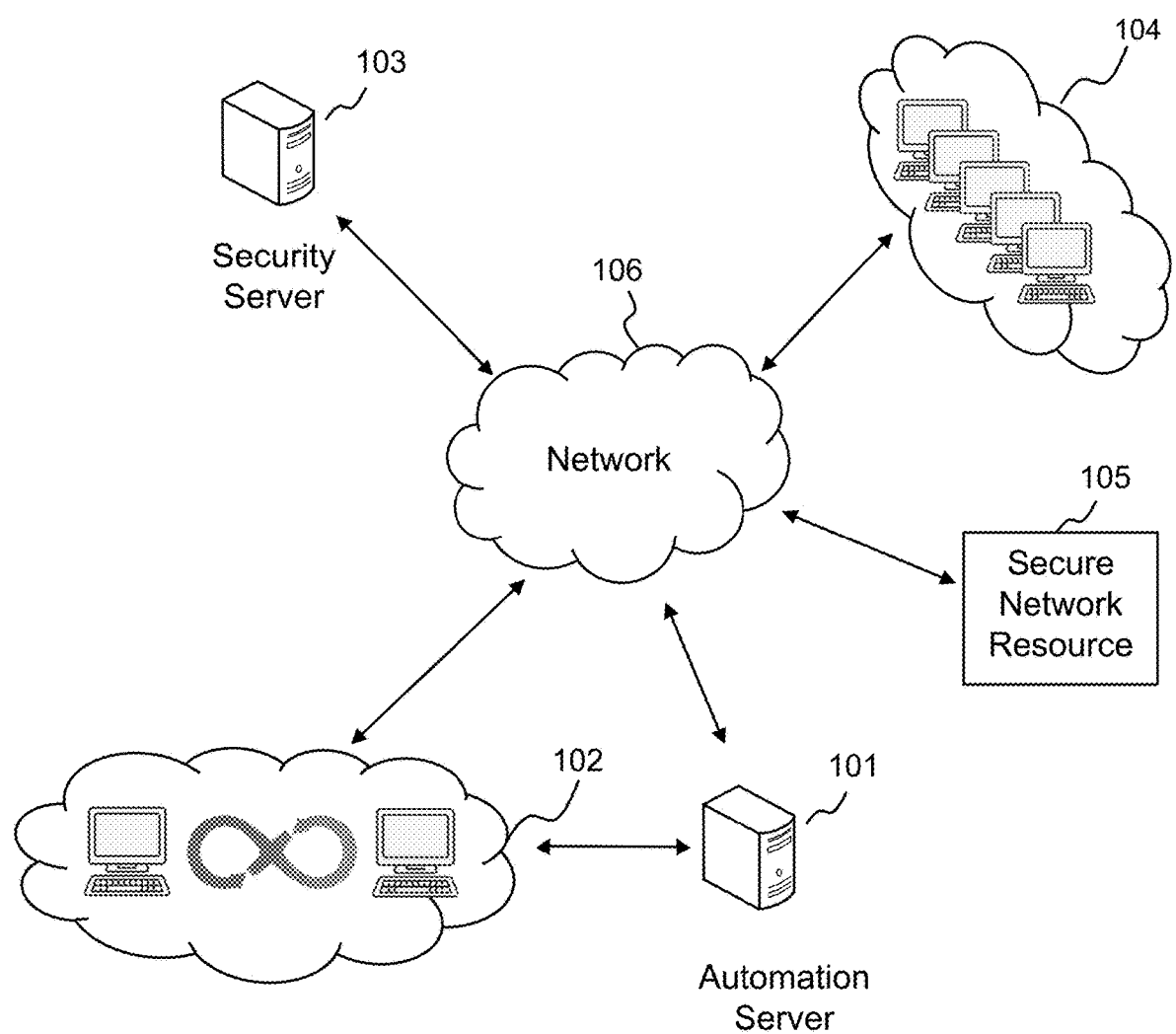
FIG. 1 is a block diagram of an exemplary system for identifying computing processes on automation servers in accordance with disclosed embodiments.

FIG. 1 is a block diagram of an exemplary system 100 for identifying computing processes on automation servers. System 100 may include one or more automation servers 101, one or more DevOps environment 102, one or more security server 103, one or more cloud computing environment 104, one or more secure network resource 105, and one or more network 106. Exemplary implementations of these components are discussed below. While FIG. 1 includes particular numbers or arrangements of these components, in various embodiments the number, arrangement, and presence of such components may vary.

Automation server 101 may be a server or other network-connected computing resource. Automation server 101 may be used as part of a continuous development or continuous deployment process. For example, automation server 101 may run a DevOps or other automation tool (such as Jenkins™, Kubernetes™ Ansible™, Chef™, Puppet™, Bamboo™, VMware ESXi™, etc.) to continuously build, test, and deploy new source code or to perform other automation functions. In some embodiments, automation server 101 may use the DevOps tool to run multiple processes simultaneously. In some embodiments, the processes run by automation server 101 may be virtual machine processes, container instance processes, serverless code processes, or other types of virtualized processes. In some embodiments, automation server 101 may operate in conjunction with DevOps environment 102. For example, automation server 101 may build, test, and run new code to be implemented by DevOps environment 102 in computing environment 104. Accordingly, automation server 101 may be part of DevOps environment 102 or separate.

DevOps environment 102 itself may implement one or more DevOps (e.g., continuous development or continuous deployment) processes, or other automation processes. In some embodiments, DevOps or similar processes may be implemented in DevOps environment 102 to continuously develop, test, or deploy new code to configure, update, or replace services or virtual machines within computing environment 104. As an example, DevOps environment 102 may develop, test, and deploy websites, mobile applications, virtualized applications, IoT devices, etc., each of which may be represented by computing environment 104. DevOps environment 102 may include one or more computers, servers, and storage resources used to implement DevOps processes. In some embodiments, new virtual instances within computing environment 104 may be configured or updated through DevOps environment 102 before they are instantiated or spun up. In various embodiments, DevOps environment 102 may be based on platforms such as Jenkins™, Chef™, Puppet™, Ansible™, Splunk™, or others, as discussed above.

System 100 may also comprise one or more security servers 103 in communication with network 106. Security server 103 may perform authentication and/or authorization for various components of system 100, as discussed further below. Security server 103 may also manage security threats and access to restricted systems or locations. In some embodiments, security server 105 may be a cloud-based security or credential storage platform. For example, permissions and credentials may be stored and managed using platforms such as CyberArk's Conjur™, CyberArk's Privileged Access Security™, Centrify's Privileged Access Service™, IBM's Security Privileged Identity Manager™, AWS's Identity and Access Management™, Azure's Active Directory Privileged Identity Management™, or various others.

System 100 may also comprise computing environment 104. In some embodiments, computing environment 104 may be a cloud computing environment. The cloud computing environment may include one or more virtual machines, container instances, or other types of virtualized instances, which may be based on virtualization tools provided by Amazon Web Services™ (AWS™), Microsoft Azure™, IBM Cloud™, Docker™, Google Cloud Platform™, Cisco Metapod™, Joyent™, vmWare™, or others. The computing environment 104 may include various computing resources, storage resources, security services, developer tools, analytics tools, etc. The computing environment 104 may also include various entities, machines, or services. In some embodiments, the computing environment 104 may be in communication with a cloud orchestrator that communicates with the different entities or components of computing environment 104 to configure and deploy cloud computing services. In various embodiments, the orchestrator may be based on platforms such as AppFormix™, BMC Cloud LifeCycle Management™, IBM Cloud Orchestrator™, AWS CloudFormation™, Kubernetes™, or others. In other embodiments, computing environment 104 may be a robotic automation platform for robotic process automation. The robotic automation platform may be based on platforms such as those by Blue Prism™, UiPath™, Pega™ Verint™, or others. Further, in some embodiments computing environment 104 may be an on-premises network of computing devices and applications (e.g., corporate or enterprise LAN), an IoT network comprising IoT devices, or other types of computing environments.

System 100 may also comprise one or more secure network resources 105. Secure network resource 105 may be a secure storage location (e.g., database or disk), server, application, physical room or area, physical device or object, or other network-accessible resources, etc. Secure network resource 105 may, in some embodiments, limit access to only authorized users, applications, or processes. In some embodiments, secure network resource 105 may be a component of computing environment 104.

Automation server 101, DevOps environment 102, security server 103, computing environment 104, and secure network resource 105 may communicate with each other as discussed below, and/or with other resources, over a network 106. Accordingly, network 106 may be composed of various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth™, infrared, etc.), or various other types of network communications. In some embodiments, network 106 may be a cloud network, (e.g., private cloud, public cloud, or hybrid cloud network), or a combination of these types of networks. In some embodiments, the communications may take place across two or more of these forms of networks and protocols.

Figure 2:
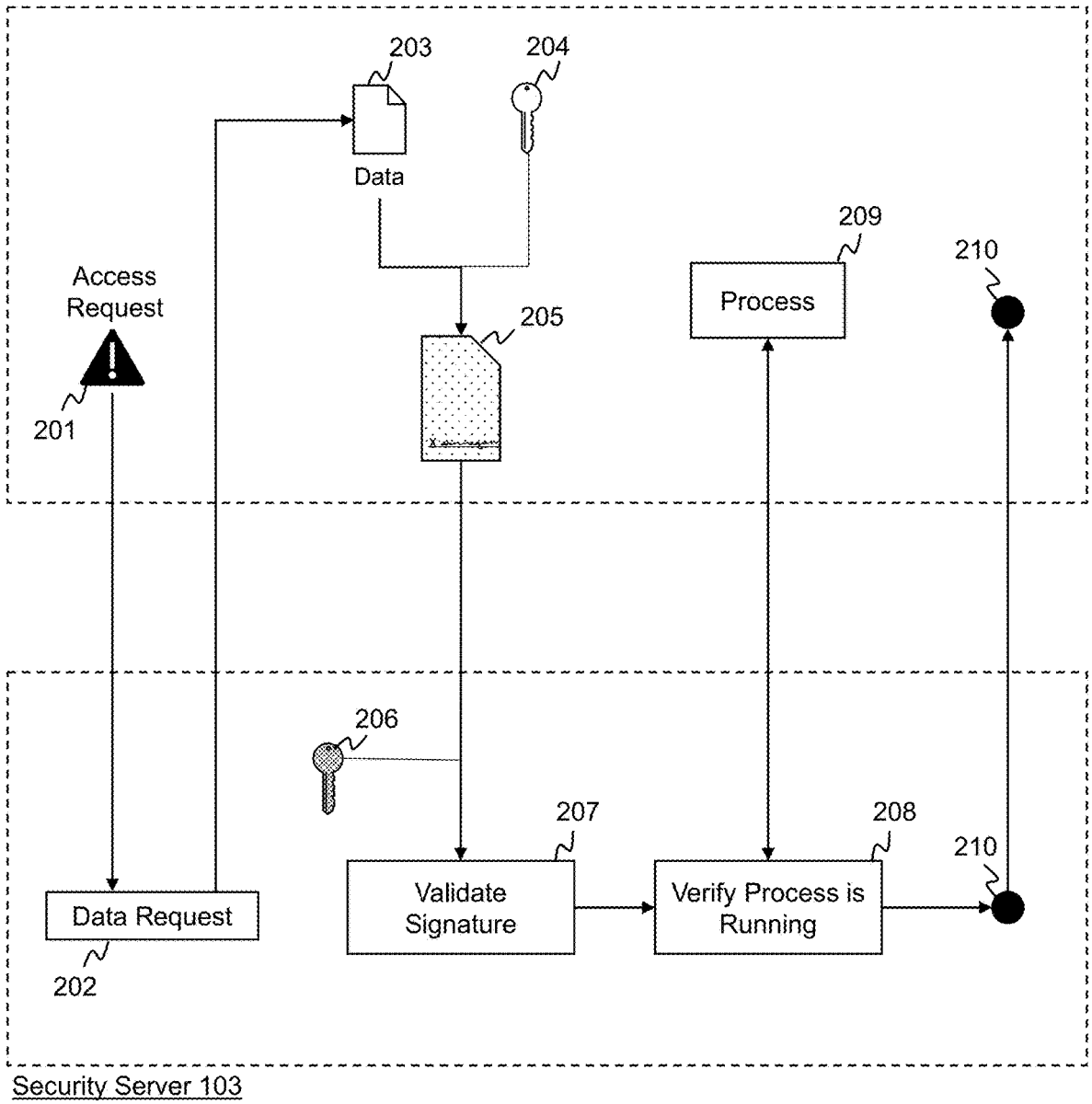
FIG. 2 is a block diagram depicting an exemplary process for identifying computing processes on automation servers in accordance with disclosed embodiments.

FIG. 2 is a block diagram depicting an exemplary process 200 for identifying processes on automation servers. Process 200 may be triggered in response to various events. For example, process 200 may occur based on an access request 201 made by a process running on automation server 101 requesting access to a secure network resource 105. For example, automation server 101 may be running new code for testing or implementation within computing environment 104. A process within the new code may require access to secure network resource 105, such as a database or server. Thus, when the process is executed by automation server 101, the process may transmit access request 201 to security server 103 and trigger process 200. As another example, process 200 may occur based on automation server 101 detecting an update to code at automation server (e.g., a new code build, version, update, patch, bug-fix, etc.). As a variation on this example, process 200 may occur when changes to code are detected in a code repository or a Source Control Management (SCM) system (e.g., GitHub™, GitLab™, BitBucket™, Gogs™, etc.) that is linked to the automation server 101. Further, in some embodiments process 200 may occur based on a periodic scan of code maintained by automation server 101. Various other scenarios may trigger a need to identify processes on automation server 101 and thus trigger process 200.

In response to receiving access request 201 or another prompt to begin process 200 as discussed above, security server 103 may transmit a data request 202 to automation server 101. Automation server 101 may then identify process data 203 associated with a process (e.g., process 209) running on automation server 101. Process data 203 may be various types of data or metadata associated with process 209 running on automation server 101, for example, process name or identifier, process start time, process instantiation time, container name or identifier, version number, associated developer username or identity, build name, build number, etc. In further embodiments, process data 203 may include various other types of data or metadata corresponding to process 209.

Automation server 101 may also identify private cryptographic key 204. In various embodiments, private key 204 may be based on a cryptographic technique such as RSA, DSS, YAK, Diffie-Hellman, etc. Private cryptographic key 204 may be associated with a corresponding public cryptographic key 206 that is maintained by security server 103. In some embodiments, the cryptographic keys 204 and 206 may be predefined. In other embodiments, the cryptographic keys 204 and 206, may be created dynamically or updated periodically, based upon the specific process being run on automation server 101, or other factors. In some embodiments, each automation server 101 may have a single private key 204. Alternatively, in some embodiments a group of automation servers 101 (e.g., a cluster of DevOps servers in an organization) may share a common private key 204. In further alternative embodiments, a single automation server 101 may have multiple private keys 204 (e.g., one private key 204 per process, per type of process, per identity, etc.). In still further embodiments, cryptographic keys 204/206 may not be asymmetric keys (i.e., private/public key pairs) but rather may be corresponding symmetric keys (e.g., based on Blowfish, AES, Twofish, DES, Serpent, etc.).

Automation server 101 may use private cryptographic key 204 to generate a digital signature 205 of process data 203. For example, automation server 101 may encrypt process data 203 using private cryptographic key 204. In alternate embodiments, private cryptographic key 204 may not encrypt process data 203 itself, but rather encrypt a separate data element or token. Automation server 101 may transmit digital signature 205 to security server 103. In some embodiments, automation server 101 may transmit process data 203 to security server 103 in lieu of or in addition to digital signature 205. The transmission of digital signature 205 and/or process data 203 from automation server 101 to security server 103 may occur via network 106. In some embodiments, automation server 101 may not send a separate access request to security server 103. For example, process 200 may begin when automation server 101 sends digital signature 205 to security server 103.

Security server 103 may identify a public cryptographic key 206. The public cryptographic key 206 may be associated with private cryptographic key 204 or automation server 101, as discussed above. For example, security server 103 may maintain one public key 206 corresponding to each private key 204, as discussed above. At block 207, security server 103 may validate the digital signature 205 using public cryptographic key 206 (or a symmetric key, if used, as discussed above). For example, security server 103 may decrypt digital signature 205 using public cryptographic key 206 (e.g., verify a hash value based on the decryption). Security server 103 may validate digital signature 205 if the decrypted data is the same as the raw process data 203 received from automation server 101. As an example, if the public cryptographic key 206 does not correspond to private cryptographic key 204, the decryption will not be the same as process data 203, and the security server may deny access to the process running on automation server 101.

Security server 103 may also verify that process 209 that corresponds to process data 203 is running (e.g., currently running) on automation server 101. For example, in some embodiments, security server 103 may have credentials permitting it to access automation server 101. Security server 103 may use the credentials to access the automation server 101 and determine that process 209 is running. This additional verification may add an additional layer of security to the system and may ensure that authorization can only occur when the process is running on automation server 101. In some embodiments, security server 103 may also compare the process data 203 received from automation server 101 to the actual data of process 209. Such verification may permit security server 103 to verify that the process data 203 or access request actually originated from automation server 101.

Although depicted as occurring later, in some embodiments, process verification 208 may occur before, or concurrently with, digital signature validation 207. In other embodiments, it may be beneficial for security server 103 to conduct process verification 208 after digital signature validation 207. As an example, if process verification 208 occurs first, the security server 103 may attempt to verify that a process is running for each request. Thus, an attacker may attempt to overwhelm automation server 101 via a denial of service attack by repeatedly sending authentication requests to security server 103. Such repeated requests may cause security server 103 to repeatedly attempt to verify that a process is running on automation server 101, thus potentially using most or all of the resources of automation server 101. If process verification 208 occurs after digital signature validation 207, security server 103 may not repeatedly send verification requests to automation server 101 because the digital signature 205 of a false request by an attacker may not be validated. Accordingly, through this aspect of process 200, denial of service attack threats may be reduced.

In some embodiments, where security server 103 has credentials for automation server 101, the privileges may be granted according to a least-privilege security policy. For example, security server 103 may provide only the privileges required to determine if a process is running (e.g., read-only or similar permissions), and no additional privileges. Such a least-privilege policy may mitigate damage of potential attacks against automation server 101 by a compromised security server 103.

Security server 103 may identify authorization data 210. Authorization data 210 may include, for example, a security token, session token, key, password, or other credential that may be used to gain access to secure network resource 105. In some embodiments, authorization data 210 may be provisioned based on a least-privilege policy such that the process receives the minimum scope of privileges necessary. In some embodiments, authorization data 210 may be data permitting or instructing automation server 101 to retrieve an access credential from security server 103 or a credential vault (e.g., CyberArk™ vault, etc.). The access credential may be provisioned based on a least-privilege policy such that the credential gives the process only the minimum scope (e.g., minimum level, minimum strength, minimum duration, etc.) of privileges necessary.

In some embodiments, authorization data 210 may define an authorization control. In some embodiments, the authorization control may be part of a security policy governing the secure network resource 105 and/or the DevOps environment 102 (e.g., based on CyberArk PSM™, AWS IAM™, Azure AD™, Kubernetes™, etc.). The authorization control may, for example, identify if or when a certain process may be authorized, govern the execution of the process in the DevOps environment 102, or enable or permit the process to perform an action at the secure network resource 105. For example, the authorization control may permit security server 103 to govern the execution of the authorized process or operation, monitor execution of the process, create an audit record of the process, or other security operations.

Security server 103 may transmit authorization data 210 to automation server 101 upon a successful verification in operations 207 and/or 208, as discussed above. Upon receiving authorization data 210, automation server 101 may use the authorization data 210 to complete the authorization and gain access to secure network resource 105 as requested by process 209. Authorization or authentication may broadly take several forms, such as verification of passwords, SSH keys, asymmetric (e.g., public/private) keys, symmetric keys, Kerberos tickets, Docker™ signed tags, and other types of cryptographic data or privileged security or access tokens.

Figure 3:
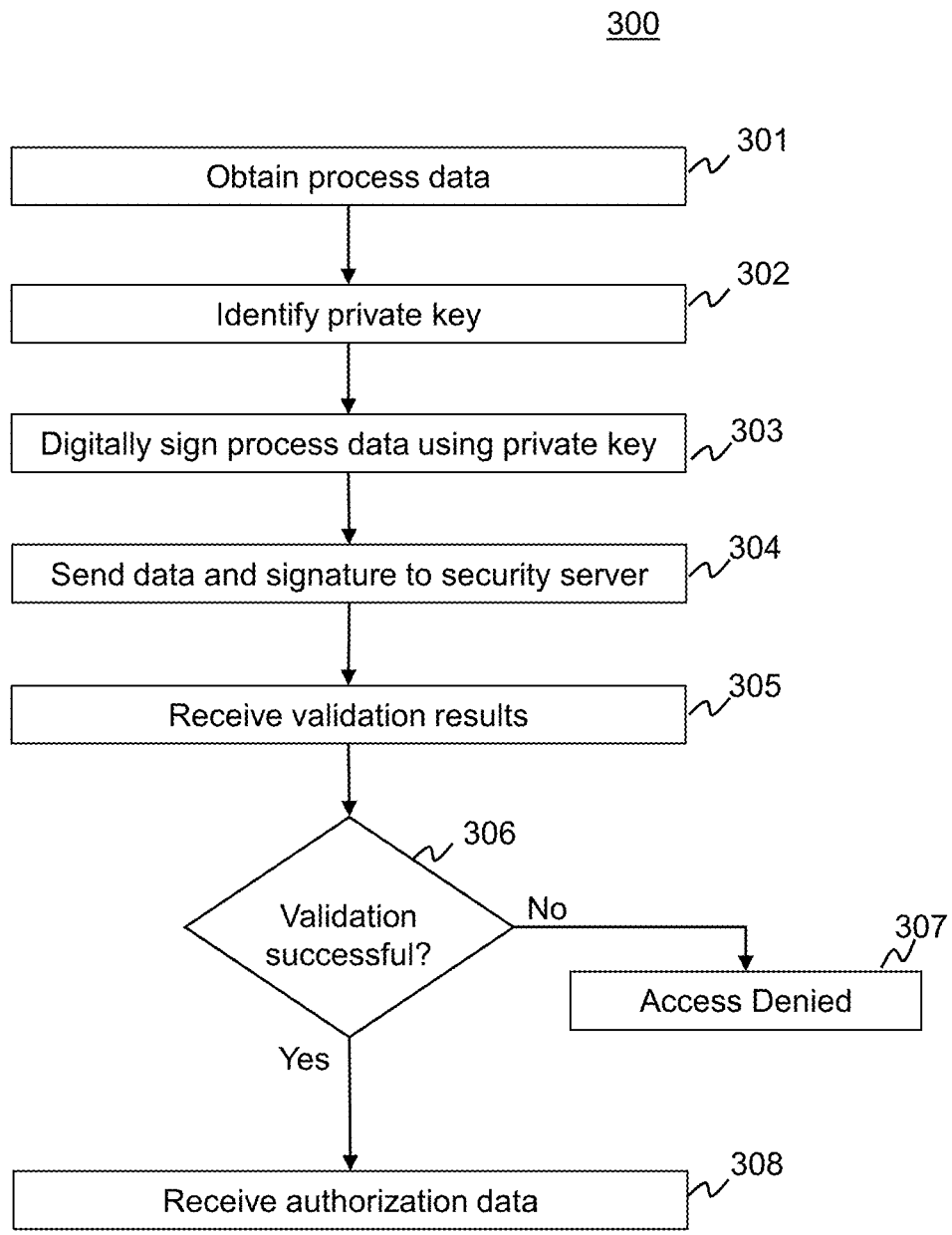
FIG. 3 is a flowchart depicting an exemplary process for identifying computing processes on automation servers in accordance with disclosed embodiments.

FIG. 3 is a flow chart depicting an exemplary process 300 for identifying processes on automation servers. Process 300 may be carried out by, for example, automation server 101. Process 300 may correspond to parts of process 200 and, accordingly, descriptions of the components and processes therein may apply to process 300 as well. Process 300 may be triggered in response to various events, as described above in connection with initiation of process 200. For example, process 300 may initiate based on detection of a process running on automation server 101 to access a secure network resource 105. Various other scenarios may trigger a need to identify processes on automation server 101 and thus trigger process 300, consistent with the discussion above. At step 301, process 300 may obtain process data 203. In some embodiments, process data 203 may be data or metadata associated with process 209. The process data 203 may take several different forms, and may be associated with a specific process running on automation server 101 (e.g., process 209). The process associated with the process data 203 may be a process running on automation server 101 that may be attempting to access secure network resource 105.

At step 302, process 300 may identify a private cryptographic key 204. In some embodiments, the private cryptographic key 204 may be predefined and stored on automation server 101. Each automation server 101 may have one or more private keys 204, as discussed above. In other embodiments, process 300 may request the private cryptographic key 204. As discussed above with respect to FIG. 2, private cryptographic key 204 may correspond to public cryptographic key 206. In some embodiments, private cryptographic key 204 and public cryptographic key 206 may be generated on demand, or may correspond to a specific process or processes. Further, in alternate embodiments private key 204 and public key 206 may each be corresponding symmetric keys.

At step 303, process 300 may digitally sign process data 203 using private key 204. Alternatively, step 303 may involve signing a different data element (e.g., token) rather than (or in addition to) process data 203. At step 304, process 300 may send process data 203 and digital signature 205 to security server 103. In some embodiments, process data 203 and digital signature are sent separately. Alternatively, they may be sent as a single transmission of process data 203 signed with digital signature 205. The transmission of step 304 of digital signature 205 and/or process data 203 from automation server 101 to security server 103 may occur via network 106. As discussed above with respect to FIG. 2, in some embodiments, the both process data 203 and digital signature 205 may be sent to security server 103.

At step 305, process 300 may include receiving validation results from security server 103. For example, in response to receiving the digital signature from automation server 101, security server 103 may validate the associated process. As discussed above, the validation may occur by the security server 103 using public key 206 to validate the digital signature 205. In some embodiments, security server 103 may also verify that the process associated with process data 203 is running on automation server 101. In further embodiments, security server 103 may verify that the access request and process data came from the automation server 101 by ensuring that the process data corresponds to the process running on automation server 101.

At step 306, process 300 may determine whether the validation results indicate that the validation was successful. If the validation was not successful, the process will be denied access to, for example, secure network resource 105 at step 307. If the validation is successful, the process will proceed to step 308, where it may receive authorization data 210 from security server 103.

As discussed above, authorization data 210 may be used by automation server 101 to gain access to secure network resource 105. As discussed above with respect to FIG. 2, authorization data 210 may include, for example, a security token, session token, password, or other credential that may be used to gain access to secure network resource 105. In some embodiments, authorization data 210 may be provisioned based on a least-privilege policy such that the process receives the minimum scope of privileges necessary. In some embodiments, authorization data 210 may be data permitting or instructing automation server 101 to retrieve an access credential from security server 103 or a credential vault. The access credential may be provisioned based on a least-privilege policy such that the credential gives the process the minimum scope (e.g., level, strength, duration, etc.) of privileges necessary. In some embodiments, authorization data 210 may define an authorization control that may identify if or when a certain process may be authorized, govern the execution of the process at the security server, or enable or permit the process to perform an action at the secure network resource 105.

Figure 4:
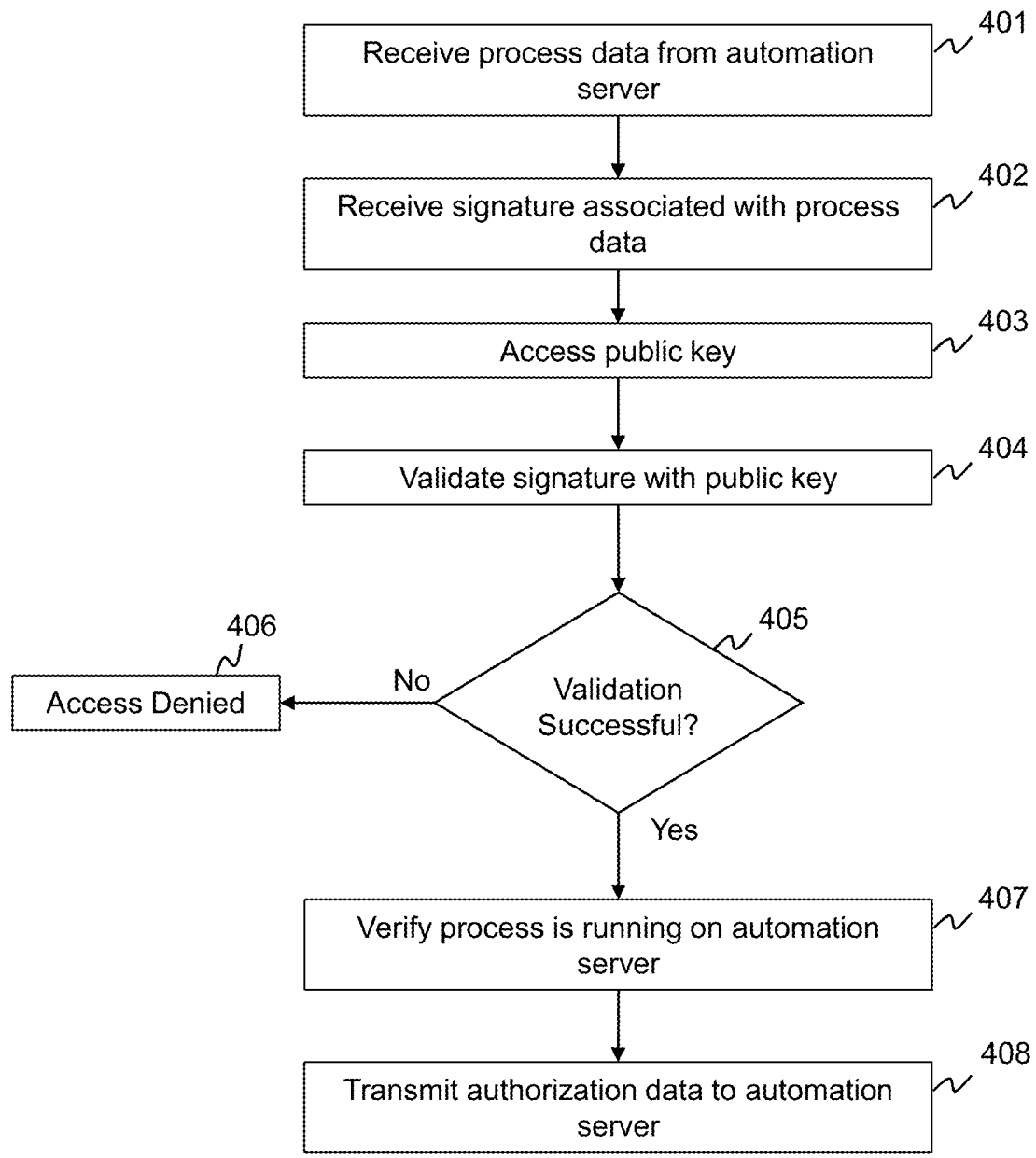
FIG. 4 is a flowchart depicting an exemplary process for identifying computing processes on automation servers in accordance with disclosed embodiments.

FIG. 4 is a flow chart depicting an exemplary process 400 for identifying processes on automation servers. Process 400 may be carried out by, for example, security server 103. Process 400 may correspond to parts of FIGS. 2 and 3. Accordingly, descriptions of the components and processes therein may apply to process 400 as well. Process 400 may be triggered in response to an attempt or request by a process running on automation server 101 to access secure network resource 105. Various other scenarios may trigger a need to identify processes on automation server 101 and thus trigger process 400, as discussed above. At step 401, process 400 may receive process data 203 from automation server 101. Additionally, or alternatively, at step 402, process 400 may receive the digital signature 205 associated with the process data 203. Digital signature 205 may be created by automation server 101 using private cryptographic key 204, consistent with above embodiments.

At step 403, process 400 may access public cryptographic key 206. As discussed above, public cryptographic key 206 may be associated as a pair with private cryptographic key 204 of automation server 101. At step 404, process 400 may validate the digital signature using public cryptographic key 206. For example, security server 103 may decrypt digital signature 205 using public cryptographic key 206 and compare the decryption to process data 203. Security server 103 may validate digital signature 205 if the decrypted data is the same as the raw process data 203 received from automation server 101. As an example, if the public cryptographic key 206 does not correspond to private cryptographic key 204, the decryption may not be the same as process data 203 and the security server 103 may deny access to the process being run on automation server 101.

At step 405, process 400 may determine if the validation was successful. If the validation is not successful, at step 406, the process running on automation server 101 may be denied access to the secure network resource 105 it attempted to access. If the validation is successful, process 400 may proceed to step 407. At step 407, process 400 may verify the process requesting access to secure network resource 105 is actually running (e.g., currently running) on automation server 101. As discussed above, process 400 may verify that the process is running on automation server 101 by using, for example, prestored or fetched credentials to access automation server 101. As discussed above, the verification of step 407 may provide extra security to the system. In some embodiments, security server 103 may have credentials permitting it to access automation server 101. Security server 103 may use the credentials to access automation server 101 and determine that process 209 is running. In some embodiments, security server 103 may also compare the process data 203 received from automation server 101 to the actual data of process 209. Such verification may permit security server 103 to verify that the process data or access request actually originated from automation server 101.

As discussed above with respect to FIG. 2, in some embodiments, process verification step 407 may occur before, or concurrently with, digital signature validation 404. In other embodiments, it may be beneficial for process 400 to conduct process verification 407 after digital signature validation 404. As an example, if process verification 407 occurs first, process 400 may attempt to verify that a process is running for each request. Thus, an attacker may attempt to overwhelm automation server 101 via a denial of service attack by repeatedly sending authentication requests, which may cause process 400 to repeatedly attempt to verify that a process is running on automation server 101, thus potentially using most or all of the resources of automation server 101. If process verification 407 occurs after digital signature validation 404, process 400 may not repeatedly send verification requests to automation server 101 because the digital signature 205 of a false request by an attacker may not be validated. Ordering process 400 such that process verification 407 occurs after digital signature validation 404 may therefore provide an additional layer of security and robustness.

At step 408, process 400 may transmit authorization data 210 to automation server 101. In some embodiments, as discussed above, automation server 101, may then use authorization data 210 to complete an authentication process and access secure network resource 105. As discussed above, authorization data 210 may include, for example, a security token, session token, password, key, or other credential that may be used to gain access to secure network resource 105. In some embodiments, authorization data 210 may be provisioned based on a least-privilege policy such that the process receives the minimum scope of privileges necessary. In some embodiments, authorization data 210 may be data permitting automation server 103 to retrieve an access credential security server 103 or a credential vault. The access credential may be provisioned based on a least-privilege policy such that the credential gives the process the minimum scope (e.g., strength, level, duration, etc.) of privileges necessary. In some embodiments, authorization data 210 may define an authorization control that may identify if or when a certain process may be authorized, govern the execution of the process at the security server, or enable or permit the process to perform an action at the secure network resource 105.

A potential use case of the disclosed embodiments is described below. It is understood that this exemplary use case is provided by way of example only and is not limiting of the present disclosure.

One potential implementation may be to identify a process being executed on an automation server 101 (e.g., Jenkins™ server) that wishes to retrieve information from a secure database 105. The process may be part of new code being tested as part of a DevOps environment 102. The process, through the automation server 101, may request access to the database 105 from a security server 103. The security server 103 may then request data corresponding to the process from the automation server 101. The automation server 101 may then obtain metadata corresponding to the process, for example, the process's build name and number, and identify a private cryptographic key. The automation server may then use the private cryptographic key to create a digital signature (e.g., signature of the process data), which it may send to the security server 103.

In response to receiving the digital signature and data, the security server 103 may validate the digital signature by reversing the encryption with a pubic cryptographic key corresponding to the private cryptographic key. The security server 103 may then use preexisting or fetched credentials for the security server 103 to access the automation server 101 and determine if the process is running. If the process is running, the security server 103 may determine that the authentication of the process is complete and transmit authorization data to the automation server 101. The authorization data may be credentials needed to read sensitive information on the secure database 105.

If either the digital signature validation or the process running verification fail, the security server 103 may not send the authorization data to the automation server 101 and the process will not obtain access to the database 105. For example, in the event that a malicious device was to request access to the database 105 through the security server 103, it may fail the signature validation and would be denied access.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for identifying processes on automation servers, the operations comprising:
   collecting process data associated with a particular process running on an automation server;
   generating a cryptographic signature associated with the process data, the cryptographic signature being generated using a first cryptographic key; and
   sending the process data and cryptographic signature to a network resource;
   wherein the network resource is configured to permit the particular process to operate according to a corresponding authorization control conditional on the network resource validating the cryptographic signature using a second cryptographic key and verifying that the particular process is running on the automation server.

2. The non-transitory computer readable medium of claim 1, wherein the validating of the cryptographic signature is performed before the verifying that the particular process is currently running on the automation server.

3. The non-transitory computer readable medium of claim 1, wherein the process data includes a build name associated with the particular process.

4. The non-transitory computer readable medium of claim 1, wherein the process data includes a build number associated with the particular process.

5. The non-transitory computer readable medium of claim 1, wherein the automation server operates in conjunction with at least one of: a continuous development platform or a continuous deployment platform.

6. The non-transitory computer readable medium of claim 1, wherein the automation server operates in conjunction with a robotic automation platform.

7. The non-transitory computer readable medium of claim 1, wherein the particular process is at least one of: a virtual machine process, a container instance process, or a serverless code process.

8. The non-transitory computer readable medium of claim 1, wherein the second cryptographic key corresponds to the automation server.

9. The non-transitory computer readable medium of claim 1, wherein the operations further comprise, conditional on the security network resource validating the cryptographic signature using the second cryptographic key, receiving authorization data for authorizing the automation server to implement the particular process.

10. The non-transitory computer readable medium of claim 1, wherein authorization data is provisioned based on a least-privilege policy that specifies a minimal scope of privileges for the particular process.

11. A computer-implemented method for identifying processes on automation servers, the method comprising:
 receiving at a network resource, from an automation server, process data associated with a particular process;
 receiving, from the automation server, a cryptographic signature associated with the process data, the cryptographic signature being generated by the automation server using a first cryptographic key;
 accessing a second cryptographic key;
 validating the cryptographic signature using the second cryptographic key;
 verifying, by the network resource and in conjunction with validating the cryptographic signature, that the particular process is running on the automation server; and
 conditional on a successful result of the validating, permitting the particular process to operate according to a corresponding authorization control.

12. The computer-implemented method of claim 11, wherein the process data is metadata associated with the particular process.

13. The computer-implemented method of claim 11, wherein the validating of the cryptographic signature is performed before the verifying that the particular process is currently running on the automation server.

14. The computer-implemented method of claim 11, further comprising, conditional on the successful result of the validating, sending authorization data to the automation server.

15. The computer-implemented method of claim 14, wherein the authorization data is provisioned based on a least-privilege policy that specifies a minimal scope of privileges for the particular process.

16. The computer-implemented method of claim 15, wherein the authorization data is configured to enable the automation server to retrieve an access credential.

17. The computer-implemented method of claim 16, wherein the access credential is provisioned in accordance with the least-privilege policy.

18. The computer-implemented method of claim 16, wherein the access credential is retrieved from a credential vault.

19. The computer-implemented method of claim 16, wherein the access credential is retrieved from the security network resource.

20. The computer-implemented method of claim 11, wherein the particular process is at least one of: a virtual machine process, a container instance process, or a serverless code process.

* * * * *